(12) United States Patent
Blonder et al.

(10) Patent No.: US 11,454,988 B2
(45) Date of Patent: Sep. 27, 2022

(54) SYSTEMS AND METHODS FOR AUTOMATED LANDING OF A DRONE

(71) Applicant: Percepto Robotics Ltd, Modiln (IL)

(72) Inventors: Sagi Blonder, Ness Ziona (IL); Ariel Benitah, Ein Zurim (IL); Eyal Gil-Ad, Yavne (IL)

(73) Assignee: Percepto Robotics Ltd, Modiln (IL)

( * ) Notice: Subject to any disclaimer, the term of this patent is extended or adjusted under 35 U.S.C. 154(b) by 340 days.

(21) Appl. No.: 16/740,533

(22) Filed: Jan. 13, 2020

(65) Prior Publication Data
US 2020/0201360 A1 Jun. 25, 2020

Related U.S. Application Data

(63) Continuation of application No. 16/080,669, filed as application No. PCT/IL2017/050820 on Jul. 20, 2017, now Pat. No. 10,551,852.
(Continued)

(51) Int. Cl.
*G05D 1/10* (2006.01)
*B64C 39/02* (2006.01)
(Continued)

(52) U.S. Cl.
CPC ......... *G05D 1/0676* (2013.01); *B64C 39/024* (2013.01); *B64D 45/08* (2013.01);
(Continued)

(58) Field of Classification Search
CPC .... G05D 1/0676; G05D 1/101; B64C 39/024; B64C 2201/027; B64C 2201/127;
(Continued)

(56) References Cited

U.S. PATENT DOCUMENTS 11,194,344 B2 * 12/2021 Li ......................... B64C 39/024
2009/0306840 A1 12/2009 Blenkhorn et al.
(Continued)

FOREIGN PATENT DOCUMENTS

WO WO 2018/015959 1/2018

OTHER PUBLICATIONS

International Preliminary Report on Patentability dated Jan. 31, 2019 From the International Bureau of WIPO Re. Application No. PCT/IL2017/050820. (8 Pages).
(Continued)

*Primary Examiner* — Brian P Sweeney

(57) ABSTRACT

There is provided a method of automatically landing a drone on a landing pad having thereon guiding-elements arranged in a pattern relative to a central region of the landing pad, comprising: receiving first image(s) captured by a camera of the drone, processing the first image(s) to compute a segmentation mask according to an estimate of a location of the landing pad, receiving second image(s) captured by the camera, processing the second image(s) according to the segmentation mask to compute a segmented region and extracting from the segmented region guiding-element(s), determining a vector for each of the extracted guiding-element(s), and aggregating the vectors to compute an estimated location of the central region of the landing pad, and navigating and landing the drone on the landing pad according to the estimated location of the central region of the landing pad.

19 Claims, 10 Drawing Sheets

Related U.S. Application Data

(60) Provisional application No. 62/364,858, filed on Jul. 21, 2016.

(51) Int. Cl.

| | | |
|---|---|---|
| *B64D 47/08* | (2006.01) | |
| *B64D 45/08* | (2006.01) | |
| *G05D 1/06* | (2006.01) | |
| *G08G 5/00* | (2006.01) | |
| *G08G 5/02* | (2006.01) | |
| *G01C 21/00* | (2006.01) | |
| *G03B 35/02* | (2021.01) | |
| *G03B 15/00* | (2021.01) | |

(52) U.S. Cl.
CPC ............ *B64D 47/08* (2013.01); *G01C 21/00* (2013.01); *G05D 1/101* (2013.01); *G08G 5/0021* (2013.01); *G08G 5/0086* (2013.01); *G08G 5/025* (2013.01); *B64C 2201/027* (2013.01); *B64C 2201/127* (2013.01); *B64C 2201/141* (2013.01); *B64C 2201/18* (2013.01); *G03B 15/006* (2013.01); *G03B 35/02* (2013.01)

(58) Field of Classification Search
CPC .......... B64C 2201/141; B64C 2201/18; B64D 45/08; B64D 47/08; G01C 21/00; G08G 5/0021; G08G 5/0086; G08G 5/025; G03B 15/006; G03B 35/02
See application file for complete search history.

(56) References Cited

U.S. PATENT DOCUMENTS

| | | |
|---|---|---|
| 2010/0168949 A1 | 7/2010 | Malecki et al. |
| 2012/0215388 A1 | 8/2012 | Pepitone et al. |
| 2012/0277934 A1 | 11/2012 | Ohtomo et al. |
| 2012/0300070 A1 | 11/2012 | Ohtomo et al. |
| 2015/0170526 A1 | 6/2015 | Wang et al. |
| 2016/0068264 A1* | 3/2016 | Ganesh ............... G06Q 10/083 701/4 |
| 2016/0093225 A1 | 3/2016 | Williams et al. |
| 2017/0045894 A1 | 2/2017 | Canoy et al. |
| 2019/0227572 A1 | 7/2019 | Blonder et al. |

OTHER PUBLICATIONS

International Search Report and the Written Opinion dated Oct. 25, 2017 From the International Searching Authority Re. Application No. PCT/IL2017/050820. (14 Pages).
Notice Of Allowance dated Sep. 20, 2019 From the US Patent and Trademark Office Re. U.S. Appl. No. 16/080,669. (14 pages).

* cited by examiner

SYSTEMS AND METHODS FOR AUTOMATED LANDING OF A DRONE

RELATED APPLICATIONS

This application is a continuation of U.S. patent application Ser. No. 16/080,669 filed on Aug. 29, 2018, which is a National Phase of PCT Patent Application No. PCT/IL2017/050820 having International filing date of Jul. 20, 2017, which claims the benefit of priority under 35 USC § 119(e) of U.S. Provisional Patent Application No. 62/364,858 filed on Jul. 21, 2016.

The contents of the above applications are incorporated by reference as if fully set forth herein in their entirety.

FIELD AND BACKGROUND OF THE INVENTION

The present invention, in some embodiments thereof, relates to automated drone navigation systems and, more specifically, but not exclusively, to systems and methods for automated landing of a drone.

An unmanned aerial vehicle (UAV), commonly known as a drone and referred to as a Remotely Piloted Aircraft (RPA) by the International Civil Aviation Organization (ICAO), is an aircraft without a human pilot aboard. Its flight is controlled either autonomously by onboard computers or by the remote control of a pilot on the ground or in another vehicle. The typical launch and recovery method of an unmanned aircraft is by the function of an automatic system or an external operator on the ground. Historically, UAVs were simple remotely piloted aircraft, but autonomous control is increasingly being employed. A UAV is capable of controlled, sustained level flight and is powered by a jet, reciprocating, or electric engine.

After many years of growth and innovation mainly in military segment, the global UAV industry is now going through a challenging period, with possible increasing of market dynamics towards wider use of UAVs for commercial and civil purposes. Tens of thousands of users have flown radio-controlled aircrafts for many years, in the past. But drones of commercial value are the result of recent advances in microprocessors, GPS, sensors, batteries, motors, lightweight structural materials, and advanced manufacturing techniques.

Commercially utilized UAVs can efficiently perform surveillance, mapping, monitoring, tracking, videography, logistics operations and other tasks without extended effort or human risk.

SUMMARY OF THE INVENTION

According to a first aspect, computer implemented method of automatically landing a drone on a landing pad having thereon a plurality of guiding-elements arranged in a pattern relative to a central region of the landing pad, comprises: receiving at least one first image captured by a camera of the drone directed towards the landing pad, processing the at least one first image to compute a segmentation mask according to an estimate of a location of the landing pad, receiving at least one second image captured by the camera, processing the at least one second image according to the segmentation mask to compute a segmented region and extracting from the segmented region at least one of the plurality of guiding-elements, determining a vector for each of the extracted at least one of the plurality of guiding-elements, and aggregating the vectors to compute an estimated location of the central region of the landing pad, and navigating and landing the drone on the landing pad according to the estimated location of the central region of the landing pad.

According to a second aspect, a system for automatically landing a drone on a landing pad having thereon a plurality of guiding-elements arranged in a pattern relative to a central region of the landing pad, comprises: a non-transitory memory having stored thereon a code for execution by at least one hardware processor of a computing device in communication with a drone navigation system of a drone, the code comprising: code for receiving at least one first image captured by a camera of the drone directed towards the landing pad, code for processing the at least one first image to compute a segmentation mask according to an estimate of a location of the landing pad, code for receiving at least one second image captured by the camera, code for processing the at least one second image according to the segmentation mask to compute a segmented region and extracting from the segmented region at least one of the plurality of guiding-elements, determining a vector for each of the extracted at least one of the plurality of guiding-elements, and aggregating the vectors to compute an estimated location of the central region of the landing pad, and navigating and landing the drone on the landing pad according to the estimated location of the central region of the landing pad.

The systems, apparatus, methods, and/or code instructions described herein relate to the technical problem of automatically landing a drone, in particular, for processing of image(s) for automatically landing the drone. Typically, drones are remote controlled, thus necessitating an operator to control the movements of the drone and its landing process. This becomes problematic, however, when the drone is deployed over obscured areas of land, for example, in enemy territory during a war, in a densely populated area, on land with topographical features such as a gorge, near geographical features that may destroy the drone (e.g., water, sand, mud), and/or requires intensive, long-range remote control scenarios that often include the need to remotely land a done (e.g., in order to recharge or replace a battery). The remote landing process for an operator, however, is often difficult, error-prone and task-dependent, which increases the probability of damaging or destroying a drone, resulting in considerable expense. In addition, a damaged drone can delay a project, causing additional time and expense. Using conventional drone systems, some operators can become fairly proficient in remotely landing a drone. Frequently, however, an operator requires extensive training and practice to be able to successfully remotely land a drone on a consistent basis. The time and expense required to train an operator to perform remote done landings is cost prohibitive to many companies that would benefit from the use of a drone. Moreover, even when adequately trained, an operator still has a fairly high risk of damaging or destroying a drone during a remote drone landing.

The systems, apparatus, methods, and/or code instructions described herein improve the performance of computational devices that provide some automated drone functions (e.g., automated takeoff, and/or automated aerial navigation) by providing such systems with the additional feature of processing image(s) for automatically landing the drone. In particular, the drone is automatically landed at a defined landing pad, which provides for example, for improved safety of objects and people in the environment, a reduction in accidents during drone landing, and the ability to automatically land almost anywhere.

In a further implementation form of the first and second aspects, the drone is automatically vertically landed on the landing pad.

In a further implementation form of the first and second aspects, the processing of the at least one first image comprises: computing a segmented image according to a segmentation of the landing pad of the at least one first image, identifying at least one closed region of the segmented image having an area according to an area requirement, computing a first correlation of each identified at least one closed region with a predefined geometrical shape of the landing pad according to a first correlation requirement denoting a tolerance of similarity of the respective closed region to the predefined geometrical shape, to identify a candidate landing pad,
computing a segmentation mask of the landing pad according to a computed estimate of the location of the central region of the candidate landing pad and an estimate of the location of the edges of the candidate landing pad.

In a further implementation form of the first and second aspects, the method further comprises and/or the system includes additional code for iteratively clustering intersecting identified closed regions to create an updated set of closed regions, terminating the iteratively clustering of the intersecting identified closed regions when at least two contours are identified having an area above a predefined threshold indicative of a rough pattern of the landing pad, and wherein the first correlation is computed for the updated set of closed regions computed when the iterative clustering terminates.

The clustering iteration process is designed to terminate when a rough pattern of the landing pad is found. A solid closed region has a single contour denoting the border (i.e., outline) of the closed region. The colored (e.g. red) portions of the landing pad, optionally a solid circle within a square, where a ring (e.g., white) appearing as background by the binary segmentation process separates between the circle and the rest of the square. The two contours defining the termination of the clustering process may include: the inner and outer borders of the square and inner circle with the ring, or the external borders of the square and the internal border of the square with the ring, or the external borders of the square and the border of the internal circle with the ring.

In a further implementation form of the first and second aspects, the segmented image computed is computed as a binary segmentation according to a segmentation threshold, wherein a first pixel value of the segmented image denotes a portion of the landing pad and a second pixel value of the segmented image denotes background.

In a further implementation form of the first and second aspects, the segmentation threshold is dynamically computed for each respective first image according to a computed histogram of the respective first image, wherein the segmentation threshold is within a tolerance requirement of a previously computed segmentation threshold for at least one previous first image.

Since the drone is relatively stable with respect to the landing pad, the segmentation threshold computed for each sequential image is assumed to not differ significantly from the segmentation threshold computed for the previous image (s). Significant differences are assumed to be due to an error.

In a further implementation form of the first and second aspects, the method further comprises and/or the system includes additional code for processing the segmented image for removal of effects of undesired features prior to the identification of the closed regions.

The removal of the undesired effects and/or artifacts and/or guiding elements is performed prior to the identification of the closed objects, to improve identification of the landing pad as a whole. When the landing pad size is above the threshold, slits, guiding elements, and/or other effects may be visible in the image (and therefore are removed) which alters further processing of the image for detection of features and/or further segmentation In a further implementation form of the first and second aspects, the method further comprises and/or the system includes additional code for processing the segmented image for removal of guiding-elements prior to the identification of the closed regions.

In a further implementation form of the first and second aspects, the predefined geometrical shape of the landing pad comprises a square, and wherein the first correlation requirement defines a tolerance of at least one of: a ratio of the lengths of the edges of the identified at least one closed region, and an angle between two edges of the identified at least one closed region.

In a further implementation form of the first and second aspects, for each identified at least one closed region intersecting at least one border of the at least one image, computing an estimate of the non-visible portion of the at least one closed region located outside of the at least one image to create an estimate of the complete shape of the at least one closed region, wherein the first correlation is computed for the estimate of the complete shape of the at least one closed region.

In a further implementation form of the first and second aspects, the estimate of the location of the central region of the landing pad is computed according to the estimate of the complete shape of the at least one closed region.

In a further implementation form of the first and second aspects, when the candidate landing pad is spaced apart from boundaries of the at least one first image, further comprising computing a second correlation of an interior closed region of the candidate landing pad with a predefined geometrical shape of the interior of the landing pad according to a second correlation requirement defining tolerance of similarity of the interior closed region and the predefined geometrical shape of the interior of the landing pad, wherein the estimate of the location of the central region is according to the location of the interior closed region of the candidate landing pad.

In a further implementation form of the first and second aspects, the method further comprises and/or the system includes additional code for identifying the landing pad according to a third correlation requirement denoting a predefined ratio between an area of the interior closed region of the candidate landing pad and an area of the corresponding larger closed region of the candidate landing pad.

In a further implementation form of the first and second aspects, the extracting of the at least one of plurality of guiding-elements comprises computing a contour of each respective guiding-element by contour finding code and storing in a memory contours according to a contour requirement.

In a further implementation form of the first and second aspects, a magnitude of the vector determined for each extracted guiding-element is computed according to a size of the respective extracted guiding-element, wherein a direction of the vector determined for each extracted guiding-element is computed according to an orientation of a distinct feature of the extracted guiding-element.

In a further implementation form of the first and second aspects, each respective guiding-element is T-shaped, wherein the stem of the T-shaped guiding-element is oriented along the certain radial axis, wherein the stem of the T-shaped guiding-element has a length indicative of the distance from the respective T-shaped guiding-element to the central region, and the cross-bar of the T-shaped guiding-element is located relatively closer to the central region than the base of the T-shaped guiding-element.

In a further implementation form of the first and second aspects, the method further comprises and/or the system includes additional code for processing the at least one second image to identify a central-mark defining a central region of the landing pad, and defining the estimated location of the central region according to the identified central-mark.

In a further implementation form of the first and second aspects, the segmentation mask comprises a binary mask, the segmented region comprises a binary segmented region, and the at least one of the plurality of guiding-elements are extracted from the binary segmented region according to contour finding code.

In a further implementation form of the first and second aspects, the segmented region is filtered to exclude features below a size requirement prior to the extracting.

In a further implementation form of the first and second aspects, extracting the at least one of the plurality of guiding-elements comprises: identifying at least one candidate guiding-element, correlating each candidate guiding-element with a predefined guiding-element template according to a guiding-element correlation requirement.

In a further implementation form of the first and second aspects, the vector associated with each respective candidate guiding-element is determined according to a vector associated with the predefined guiding-template correlated with the respective guiding-element.

In a further implementation form of the first and second aspects, the method further comprises and/or the system includes additional code for converting a first color space of each captured first and second image to a second color space according to the predefined color of the landing pad relative to expected colors of the environment in proximity to the landing pad, and processing the converted first and second images.

In a further implementation form of the first and second aspects, the first color space is RGB (red, green, blue), the second color space is LUV, and the processing is performed according to the U channel of the converted first and second images.

In a further implementation form of the first and second aspects, the method further comprises and/or the system includes additional code for processing the at least one second image and/or processing a received at least one third image captured by the camera, to extract a central-mark from the at least one second image and/or at least one third image, wherein the central-mark defines the central region of the landing pad, wherein the navigating and landing the drone is performed according to the extracted central-mark.

In a further implementation form of the first and second aspects, the extraction of the central-mark from the at least one second image and/or the at least one third image is performed by contour finding code according to edge detection.

In a further implementation form of the first and second aspects, the at least one first image and the at least one second image are frames extracted from a video captured by a video camera.

According to a third aspect, a landing pad for automated vertical landing of a drone thereof, the landing pad comprises: a pad having surface dimensions sized for contacting the drone, a plurality of guiding-elements arranged along a plurality of radial axes radiating from a central region, at a plurality of radial distances away from the central region, each of the plurality of guiding-element includes a distinct feature oriented towards the central region and a size of each of the plurality of guiding-element is indicative of the radial distance of the respective guiding-element away from the central region.

In a further implementation form of the third aspect, each respective guiding-element is T-shaped, wherein the stem of the T-shaped guiding-element is oriented along the certain radial axis radiating out from the central region, the length of the stem is indicative of a distance from the respective T-shaped guiding element to the central region, and the cross-bar of the T-shaped guiding-element is located relatively closer to the central region than the base of the T-shaped guiding-element.

In a further implementation form of the third aspect, the surface of the landing pad has a predefined color selected for differentiating the landing pad from colors of the environment in proximity to the landing pad.

In a further implementation form of the third aspect, the color of the surface of the landing pad is red.

In a further implementation form of the third aspect, the landing pad is square shaped.

In a further implementation form of the third aspect, the landing pad further comprises a circled marked within the square shaped landing pad.

In a further implementation form of the third aspect, the landing pad further includes a mark denoting the location of the central region.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
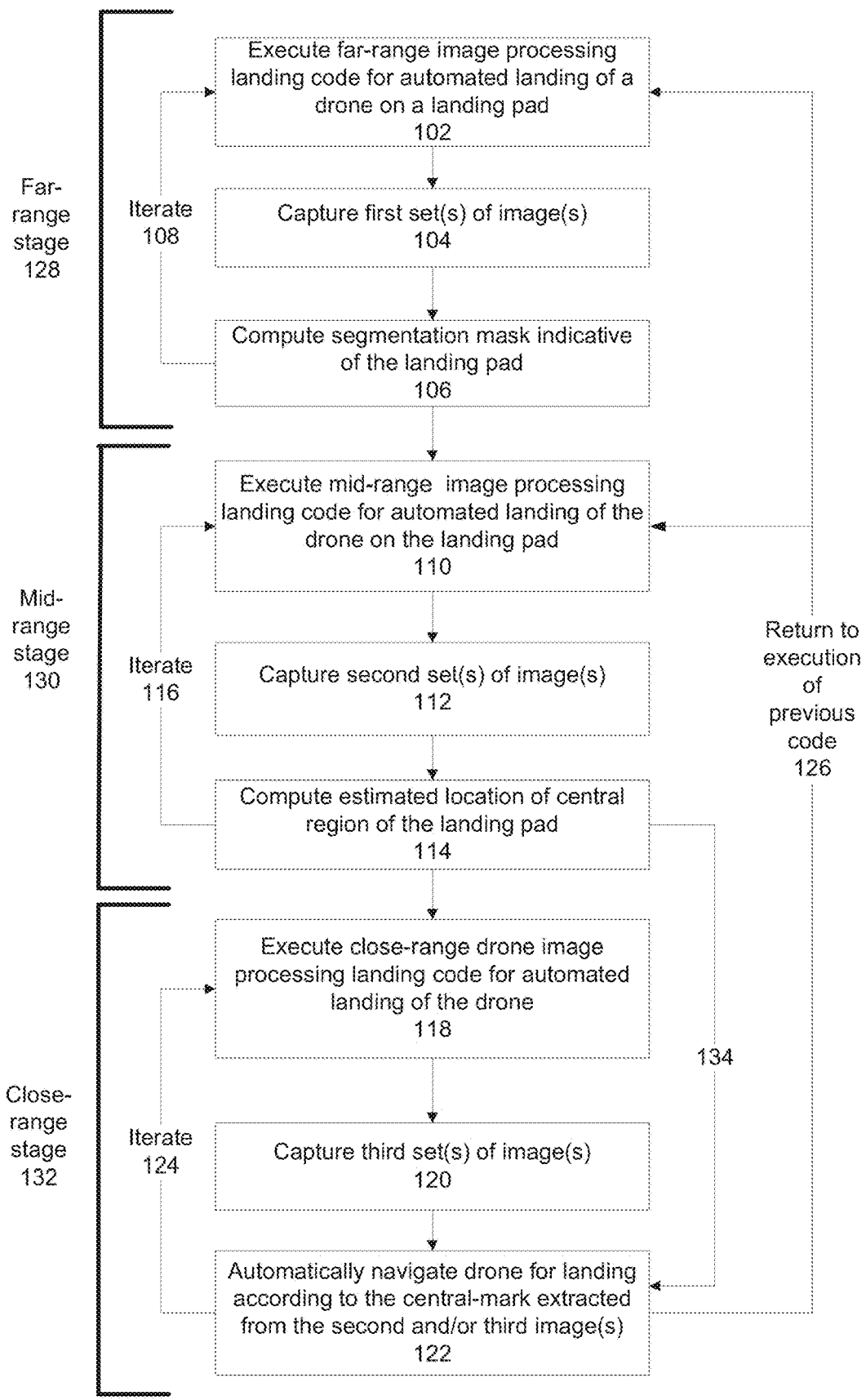
FIG. 1 is a flowchart of a multi-stage process of automatically navigating and landing a drone on a landing pad according to a segmentation mask and guiding-elements extracted from image(s) of the landing pad, in accordance with some embodiments of the present invention.

The present invention, in some embodiments thereof, relates to automated drone navigation systems and, more specifically, but not exclusively, to systems and methods for automated landing of a drone.

An aspect of some embodiments of the present invention relates to systems, an apparatus, methods, and/or code instructions (stored in a data storage device, executable by one or more hardware processors) for multi-stage automated landing, optionally vertical landing, of a drone on a landing pad. The multi-stage landing processes is triggered when the drone is located at an estimated location of the landing pad, for example, upon navigation to the estimated landing location by a drone navigation system according to global positioning system (GPS) coordinates. Each stage of the multi-stage automated landing process is executed according to data extracted from an image of the landing pad captured by a camera of the drone. Execution of far-range drone image processing landing code is triggered for processing of one or more first types of images captured by the camera, to compute a segmentation mask according to an estimated location of the landing pad within the image. Execution of mid-range drone image processing landing code is triggered in response to a requirement (e.g., location of the segmentation mask within the image), for processing one or more second images according to the segmentation mask for computing a segmented region of the landing pad. One or more guiding-elements are extracted from the segmented region. An aggregation of vector data determined for each extracted guiding-element is performed for computing an estimated location of the central region of the landing pad. Execution of close-range drone image processing landing code is triggered in response to a requirement (e.g., certainty of the computed estimated location of the central region), for processing image(s) for navigating and landing, optionally vertically landing, the drone on the landing pad according to the estimated location of the central region of the landing pad and/or according to an extracted central-mark defining the actual location of the central region.

An aspect of some embodiments of the present invention relates to a landing pad for automated landing, optionally vertically landing, of a drone executing a multi-stage landing code. The dimensions of the surface of the landing pad are sized for contacting the drone. Guiding-elements are arranged along the surface of the landing pad relative to a central region of the landing pad. Each guiding-element is located along a certain radial axis radiating from the central region, at a certain radial distance away from the central region. Each guiding-element includes a distinct feature oriented towards the central region. The size (e.g., length) of each guiding-element is indicative of the radial distance of the respective guiding-element away from the central region.

The systems, apparatus, methods, and/or code instructions described herein relate to the technical problem of automatically landing a drone, in particular, for processing of image (s) for automatically landing the drone. Typically, drones are remote controlled, thus necessitating an operator to control the movements of the drone and its landing process. This becomes problematic, however, when the drone is deployed over obscured areas of land, for example, in enemy territory during a war, in a densely populated area, on land with topographical features such as a gorge, near geographical features that may destroy the drone (e.g., water, sand, mud), and/or requires intensive, long-range remote control scenarios that often include the need to remotely land a done (e.g., in order to recharge or replace a battery). The remote landing process for an operator, however, is often difficult, error-prone and task-dependent, which increases the probability of damaging or destroying a drone, resulting in considerable expense. In addition, a damaged drone can delay a project, causing additional time and expense. Using conventional drone systems, some operators can become fairly proficient in remotely landing a drone. Frequently, however, an operator requires extensive training and practice to be able to successfully remotely land a drone on a consistent basis. The time and expense required to train an operator to perform remote done landings is cost prohibitive to many companies that would benefit from the use of a drone. Moreover, even when adequately trained, an operator still has a fairly high risk of damaging or destroying a drone during a remote drone landing.

The systems, apparatus, methods, and/or code instructions described herein improve the performance of computational devices that provide some automated drone functions (e.g., automated takeoff, and/or automated aerial navigation) by providing such systems with the additional feature of processing image(s) for automatically landing the drone. In particular, the drone is automatically landed at a defined landing pad, which provides for example, for improved safety of objects and people in the environment, a reduction in accidents during drone landing, and the ability to automatically land almost anywhere.

The systems, apparatus, methods, and/or code instructions described herein improve an underlying technical process within the field of drone navigation, in particular, within the field of image processing for automated drone landing.

The systems, apparatus, methods, and/or code instructions described herein do not simply describe the processing of images to identify portions of a landing pad using a mathematical operation and receiving and storing data, but combine the acts of executing far-range image processing landing code for processing image(s) for searching for a location of the landing pad, by receiving an image captured by a camera, processing the image to compute a segmentation mask of the landing pad, executing mid-range image processing landing code for processing image(s) for navigating the drone according to the location of the landing pad, receiving another image, processing the other image to extract guiding-elements, aggregating vector data associated with the guiding-elements to compute an estimated location of the central region of the landing pad, and executing close-range image processing landing code for processing image(s) for navigating and vertically landing the drone according to the central region of the landing pad. By this, the systems and/or apparatus and/or methods and/or code instructions described here go beyond the mere concept of simply retrieving and combining data using a computer.

The systems, apparatus, methods, and/or code instructions described herein are tied to physical real-life components, including one or more of: a camera that captures the image (s) that are analyzed to identify the landing pad for guiding the automated landing of the drone, the drone, and one or more hardware processors that execute code instructions (and/or a hardware implementation of the code instruction) for analyzing the images.

Accordingly the systems, apparatus, methods, and/or code instructions described herein are inextricably tied to computing technology, to overcome an actual technical problem arising in automated landing of a drone, in particular, processing of image(s) for automated landing of the drone.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
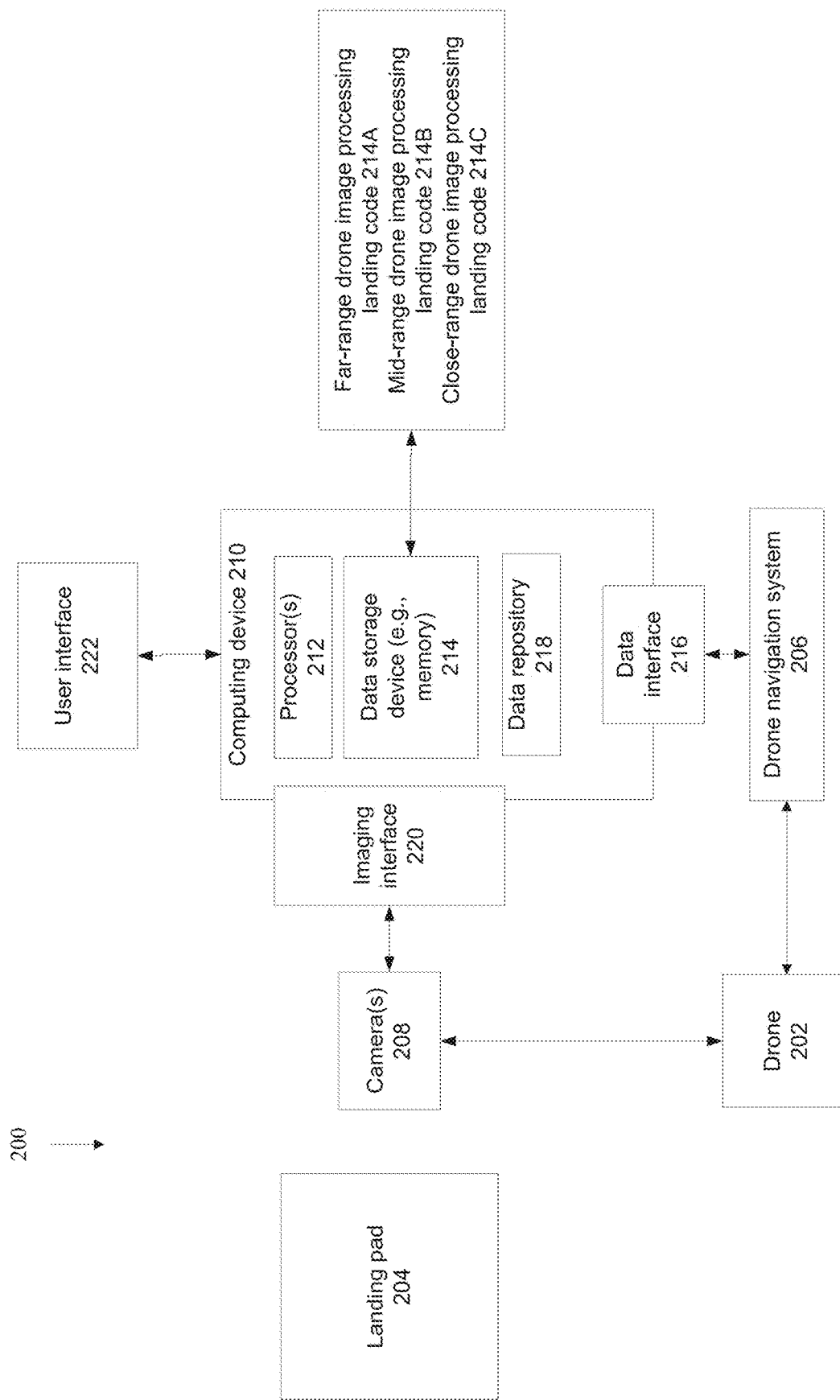
FIG. 2 is a block diagram of components of a system for automatically navigating and landing a drone on a landing pad according to a segmentation mask and guiding-elements extracted from image(s) of the landing pad, in accordance with some embodiments of the present invention.

Reference is now made to FIG. 1, which is a flowchart of a multi-stage process of automatically navigating and landing a drone on a landing pad according to a segmentation mask and guiding-elements extracted from image(s) of the landing pad, in accordance with some embodiments of the present invention. Acts 102-108 denote a far-range stage 128, acts 110-116 denote a mid-range stage, and acts 118-124 denote a close-range stage 132. Captured images are processed differently, to extract different information which is provided to the next stage and used for landing the drone, as described herein. Reference is also made to FIG. 2, which is a block diagram of components of a system 200 for automatically navigating and landing a drone 202 on a landing pad 204 according to a segmentation mask and guiding-elements extracted from image(s) of the landing pad, in accordance with some embodiments of the present invention.

Drone 202 (also referred to as an unmanned aerial vehicle (UAV)) interchangeably refers, but not limited to such as an aircraft that can be piloted autonomously or remotely by a drone navigation system 206. For example, drone 202 may be used for multiple purposes or applications (e.g., military, agriculture, surveillance, etc.). Drone 202 includes may include onboard computers that control the autonomous flight of the drone. Exemplary drones 202 include a multi-rotor vehicle, such as a quadcopter, and may include one of more of: a carbon fiber shell, integrated electronics, a battery bay (including a battery assembly), a global positioning system (GPS) receiver, a fixed or swappable imaging capability (e.g., a digital camera 208), and various sensors and/or receivers.

Drone 202 is designed for vertical landing on landing pad 204. It is noted that drone 202 may be designed as a helicopter, or plane with vertical landing capabilities, or other implementations.

Drone 202 is associated with a computing device 210 that includes one or more hardware processors 212 that execute code instructions 214A-C for autonomous multi-stage landing of drone 202 on landing pad 204. Computing device 210 may be installed on broad drone 202. Alternatively or additionally, computing device 210 may be located at a ground station terminal, in wireless communication with drone 202 via a data interface 216. It is noted that one or more features may be implemented as code instructions executed by processor(s) 212 and/or may be implemented as hardware and/or firmware.

Processor(s) 212 of computing device 210 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 212 may include one or more processors (homogenous or heterogeneous), which may be arranged for parallel processing, as clusters and/or as one or more multi core processing units.

Storage device (also known herein as a program store, e.g., a memory) 214 stores code instructions implementable by processor(s) 212, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Storage device 214 stores code instructions 214A-C that executes one or more acts of the method described with reference to FIGS. 1, 4, and 5.

Computing device 210 may include a data repository 218 for storing data, for example, storing one or more of: images captured by camera 208, computed segmentation masks, templates for segmentation of the guiding-elements. Data repository 216 may be implemented as, for example, a memory, a local hard-drive, a removable storage unit, an optical disk, a storage device, and/or as a remote server and/or computing cloud (e.g., accessed via a network connection). It is noted that, for example, executing portions of data stored in data repository 218 are loaded from data repository 218 into memory 214 for execution by processor(s) 212.

Computing device 210 receives one or more images for processing captured by camera 208 installed on drone 202 (e.g., integrated with drone 202, or a removable and replaceable component). Camera 208 is positioned for capturing ground-based images when drone 202 is airborne. Camera 208 may be implemented as, for example, a digital camera, a video camera, and an imaging sensor. Optionally, camera 208 captures two dimensional (2D) images in color, optionally based on the red-green-blue (RGB) color space.

Computing device 210 receives the image(s) captured by camera 208 via one or more image interface(s) 220, for example, a wire connection, a wireless connection, a local bus, other physical interface implementations, and/or virtual interfaces (e.g., software interface, application programming interface (API), software development kit (SDK)).

Computing device 210 may include a data interface 216 for communicating with drone navigation system 206, for example, to provide drone navigation system with an indication of which flight image processing landing code to execute, and/or to received triggers from drone navigation system to execute locally stored code instructions for identifying the landing pad. Drone navigation system 206 may reside onboard drone 202, and/or may reside externally to drone 202, for example, at a ground station. Exemplary data interfaces 216 include: a local bus, wired connection ports, virtual interfaces (e.g., API, SDK), a network interface (e.g., a network interface card), and/or a wireless interface for wireless communication.

It is noted that drone navigation system 206 may be integrated with code instructions 214A-C, for example as a set of code instructions, for example provided by a single entity (e.g., sold by a single provider, and/or manufactured by a single manufacturer). Alternatively, code instructions 214A-C may be stored independently of drone navigation system 206, with communication between code instructions 214A-C and drone navigation system 206 occurring, for example, via software interfaces (e.g., API, SDK, libraries, function calls). For example, drone navigation system 206 is provided by a different entity and/or manufactured by a different manufacturer than that of code instructions 214A-C.

Computing device 210 may be in communication with a user interface 222 that includes a mechanism for a user to enter data (e.g., manually trigger the automated landing process and/or enter configuration parameters) and/or view presented data (e.g., view the captured images and/or data indicative of the progression of the automated landing process. User interface 222 may be remotely located from computing device 210, for example, a smartphone in cellular and/or wireless communication with computing device 210 installed on drone 202. User interface 222 may be locally installed on drone 202, for example, a touchscreen located on the drone 202. Exemplary user interfaces 222 include for example, one or more of, a touchscreen, a display, a keyboard, a mouse, and voice activated software using speakers and microphone. User interface 222 may include a graphical user interface (GUI) presented on a display.

Figure 3:
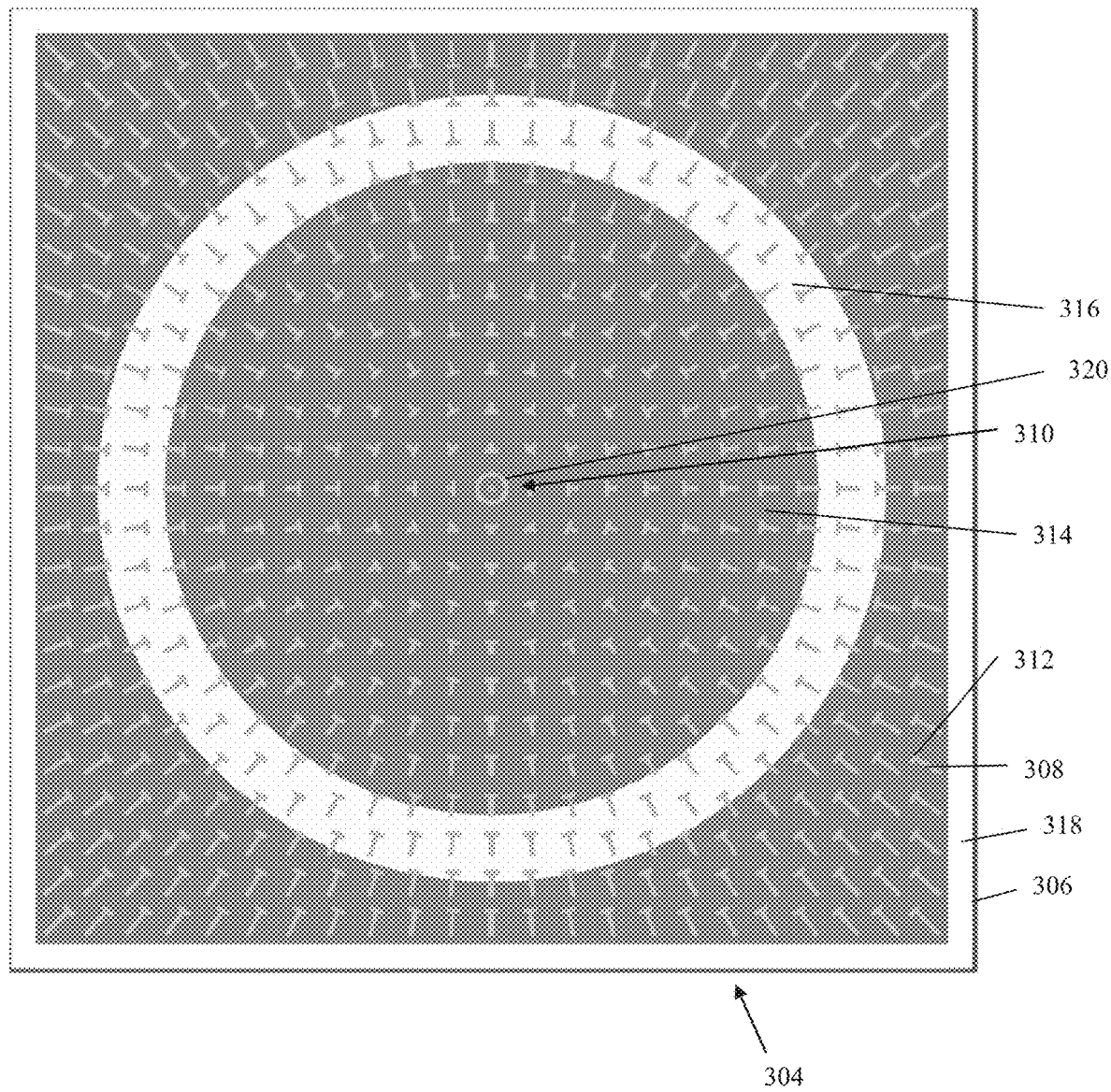
FIG. 3 is a schematic of an exemplary landing pad for automated vertical landing of a drone based on processing of images of the landing pad captured by a camera of the drone, in accordance with some embodiments of the present invention.

Reference is now made to FIG. 3, which is a schematic of an exemplary landing pad 304 for automated landing of a drone based on processing of images of the landing pad captured by a camera of the drone, in accordance with some embodiments of the present invention.

Landing pad 304 includes a surface 306 having surface dimensions sized for contacting the drone, for example, large enough to support the drone resting on surface 306.

Multiple guiding-elements 308 are arranged on surface 306 of landing pad 304, for example, painted there-on, stickers, and/or metallic elements bonded to the surface. Each guiding-element 308 is arranged along a certain radial axis (i.e., line alone a radius, which is not demarcated on surface 306) radiating from a central region 310 denoted by a central-mark 320 (optionally a bull's eye pattern), at a certain radial distance away from central region 310. The length of each guiding-element is indicative of the distance from the respective guiding-element 308 to the central region 310 of the landing pad. Guiding-elements 308 may be arranged according to an alternating pattern, as shown.

Each guiding-element 308 includes a distinct feature 312 oriented towards central region 310.

Optionally, and as shown, each guiding-element 308 is T-shaped. The stem of the T-shaped guiding-element 308 is oriented along the certain radial axis, and the cross-bar of the T-shaped guiding-element 308 which may act as distinct feature 312, is located relatively closer to central region 310 than the base of T-shaped guiding-element 308. Alternatively or additionally, distinct feature 312 is defined by the size (e.g., area, length, and/or width) of T-shaped guiding element 308. The length of the stem of the T-shaped guiding-element 308 is indicative of the distance to central region 310. Guiding-element 308 may be implemented as other shapes, which may be symmetrical along the long axis, include distinct feature 312 and have a size (e.g., length) corresponding to the distance from the respective guiding-element to the central region, for example, Y, V, !, and an arrow.

Optionally, surface 306 is square shaped. Optionally, a circle 314 is demarcated within the square shaped surface 306 of landing pad 304. Circle 314 may include an outer rim 316 of a color that is distinct from an inner portion of circle 314, for example, out rim 316 is white, and inner portion and optionally the rest of the surface is red. The white circle (i.e., outer rim 316) facilitates recognition distinction for another object in the environment to not being confused with the landing pad. The white circle may be rotational invariant. An elliptic shape is recognizable from any viewing direction, including low viewing angles.

It is noted that outer rim 316 may include guiding elements 308, or may guiding-elements 308 may be absent from the outer rim 316 region.

Optionally, surface 306 of landing pad 304 has a pre-defined color selected for differentiating landing pad 304 from colors of the environment in proximity to the landing pad, for example, a shade of red to differentiate from the green, brown, grey, and blue colors found outdoors. Optionally, outer rim 316 is a different color, for example, white.

Optionally, surface 306 includes a frame 318 of a different color than the major color of surface 306, optionally, the same color as outer rim 316, for example, white. Alternatively, frame 318 is absent from surface 306, and/or is colored with the same or similar color as surface 306.

The landing pad having a square shape with a white frame enables estimation of the square shape center with two or more corners visible, while the white fame is easily detectable by the drone computer vision.

Optionally, guiding-elements 308 have a distinct color that provides contrast with the rest of the surface, for example, cyan. The cyan color has the highest contrast with red (i.e., exemplary color of the surface) on all 3 RGB color channels (cyan is the inverse of red, no matter the color model). The cyan pattern may improve the process of extraction of guiding-elements from captured images. The more guiding-elements that are visualized, the better the estimate of the center location.

Center region 310 of landing pad 304 may include one or more rotational invariant circles (e.g., outer rim 316, central-mark 320), which are easily recognized no matter the direction of the drone above the landing pad. It is noted that the actual location of landing does not necessarily have to be in the center of the landing pad pattern, however, the guiding-elements direct to the central region no matter the location of the central region. The computed estimated location of the central region may be estimated before the cyan pattern is identified. Moreover, an additional design element can be added to the pattern in order to break symmetry in case the UAV is facing a specific direction when landing and the cyan elements can be cleared from the white circle, to maximize contrast.

Referring now back to FIG. 1, at 102, execution of a far-range drone image processing landing code (e.g., code 214A stored in memory 214) for processing image(s) for searching for the location of the landing pad is triggered. The far-range drone image processing landing code 214A is a first phase of a multi-phase process for automatic landing of the drone according to the location of the landing pad. For example, the navigation system of the drone is programmed to search for the landing pad, for example, by a predefined search pattern, or based on other feedback.

The execution of the far-range drone image processing landing code may be triggered, for example, manually by a user (e.g., located on the ground) pressing a button to trigger the automated landing of the drone, and/or automatically triggered by drone navigation code as part of an autonomous flight routine, when the drone navigation code determines that the drone is to be landed, and/or automatically triggered when a set-of-rules is met, for example, the drone is above a predefined elevation threshold (e.g., about 4 meters, about 5 meters, about 10 meters, or other values). For example, the drone navigation code navigates the drone to a geographic location (e.g., coordinates, latitude and longitude values) denoting an approximate area where the landing pad is expected to be located, for example, global positioning system (GPS) based navigation. The execution of the far-range drone image processing landing code may be triggered when the drone arrives at the geographic location.

Optionally, when the drone initially detects the landing pad, data outputted by a compass of the navigation system is processed for alignment of the drone for landing, optional yaw-wise alignment.

At 104, one or more first sets of images are captured by the camera of the drone. The camera is positioned in a direction towards a landing region, for captured images of the landing region that may include the landing pad.

As used herein, the term image and images are sometimes interchangeable, and sometimes are referred to as image(s).

Images may be captured as a video, from which individual frames are extracted for processing, captured as still images spaced apart in time (e.g., based on pre-defined time intervals which may not necessarily be equal intervals), and/or captured as still images and/or video according to instructions of far-range drone image processing landing code, for example, on an as-needed basis, and/or captured according to a set-of-rules and/or captured according to one or more predefined events, for example, when the drone changes position.

Images may be captured by one or more cameras. Images captured by different cameras may be analyzed independently of one another, or may be combined into a single panoramic images that is analyzed.

Optionally, the images are captured according to a certain color space, optionally, RGB.

The images may be converted from the certain color space to another color space, for example, LUV. The conversion may be based on the predefined color(s) of the landing pad. Alternatively or additionally, the color(s) of the landing pad are selected according to the original color space and/or the converted color space, to improve contrast between the landing pad and the surrounding environment, as described herein.

Optionally, the U channel is extracted from the image(s) converted into the LUV color space from the RGB color space. The U channel is further processed as described herein.

At 106, the first image(s) (e.g., the U channel of the color converted image) is processed to compute a segmentation mask according to an estimate of a location of the landing pad within the image. The segmentation mask corresponds to the location of the landing pad (or portion thereof) within the image.

Figure 4:
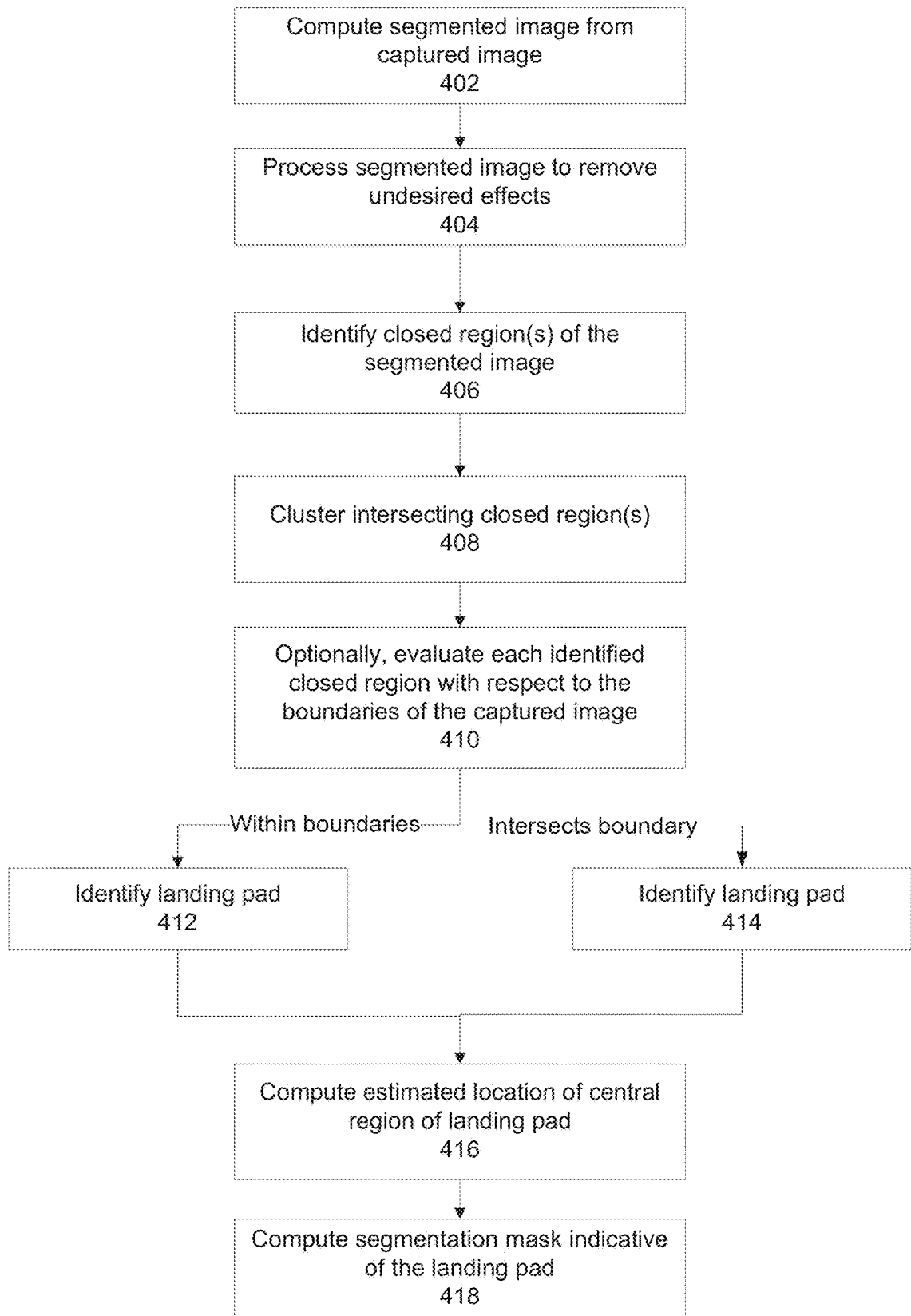
FIG. 4 is a flowchart of a method of processing one or more images captured by the camera of the drone for computation of a segmentation mask of the landing pad by executing far-range drone image processing landing code of the multi-stage landing process, in accordance with some embodiments of the present invention.

Reference is also made to FIG. 4, which is a flowchart of a method of processing one or more images captured by the camera of the drone for computation of a segmentation mask of the landing pad by executing far-range drone image processing landing code of the multi-stage landing process, in accordance with some embodiments of the present invention. The segmentation mask is computed according to a computed size of a previously successfully computed segmentation mask from one or more previous images.

At 402, a segmented image is computed according to a segmentation of the landing pad of the first image. The landing pad may be segmented according to the following exemplary method:

The segmented image is computed as a binary segmentation computed according to a segmentation threshold denoting a pixel intensity value (or other segmentation requirement). A first pixel value of the segmented image denotes a portion of the landing pad, and a second pixel value of the segmented image denotes background. For example, the U channel image is segmented according to the histogram computed according to pixel intensity value. Pixels with intensity value higher than the segmentation threshold are assigned a first value indicative of the landing pad, for example, pixel intensity value=255. Pixels with intensity value lower than the segmentation value are assigned a second value indicative of background, for example pixel intensity value=0.

Optionally, the segmented threshold is computed according to a computed histogram of the first image.

Optionally, the segmentation threshold is dynamically computed for each image of a sequence of first images. The segmentation threshold is computed on the first acquired image then updated, optionally according to the difference between the computed threshold on the current image and the computed threshold on the previous image.

Optionally, the segmentation threshold dynamically computed for each first image is evaluated to determine whether the segmentation threshold is within a tolerance requirement of a previously computed segmentation threshold for at least one previous first image. Since the drone is relatively stable with respect to the landing pad, the segmentation threshold computed for each sequential image is assumed to not differ significantly from the segmentation threshold computed for the previous image(s). Significant differences are assumed to be due to an error.

At 404, the segmented image may be processed for removal of undesired effects and/or artifacts, for example, effects of glare, reflections of the sun, shadows produced by the drone on the landing pad, and slits in the landing pad. Alternatively or additionally, the removal of the undesired effects and/or artifacts is performed by the conversion of the image from RGB to the LUV.

Optionally, the processing is performed for removal of the guiding-elements prior to the identification of the closed objects. The processing may be performed by one or more filters designed for smoothing and/or morphological processing.

The segmented image may be processed according to the landing pad size within the image, for example the processing is performed when the landing pad size is above a threshold, and/or the filters may be selected according to the landing pad size.

The removal of the undesired effects and/or artifacts and/or guiding elements is performed prior to the identification of the closed objects, to improve identification of the landing pad as a whole. When the landing pad size is above the threshold, slits, guiding elements, and/or other effects may be visible in the image (and therefore are removed) which alters further processing of the image for detection of features and/or further segmentation.

At 406, one or more closed regions of the segmented image are identified. Closed regions are identified as having a computed area according to an area requirement, for example, a threshold. Closed regions with area sizes above the threshold are retained. The computed area is stored in association with the identified closed region that are retained (e.g., as a metadata tag, in a database, and/or in a list).

Each closed region is identified (e.g., tagged, or stored as a parameter in the database and/or list) as contacting a border of the image (i.e., a portion of the closed region is located outside of the image and therefore not fully visible on the image), or identified as spaced apart (i.e., not contacting) a border of the image (i.e., the closed region is fully captured within the image)

Closed regions may be detected, for example, by executing a findCountour( ) function from the OpenCV (Open Source Computer Vision Library) image library.

Optionally, at 408, closed regions that intersect one another may be clustered using one or more clustering methods (e.g., based on k-means clustering code). The clustering of the intersecting closed regions creates an updated set of closed regions. The areas of the closed regions created from the clustering may be computed accordingly. The clustering may be iterated (i.e., the intersecting closed regions created from the first clustering iteration are further clustered during a second iteration to create another set of closed regions). The clustering iteration process may terminate when the closed regions include at least two contours and/or have an area above a predefined are threshold.

The clustering iteration process is designed to terminate when a rough pattern of the landing pad is found. A solid closed region has a single contour denoting the border (i.e., outline) of the closed region. The colored (e.g. red) portions of the landing pad, optionally a solid circle within a square, where a ring (e.g., white) appearing as background by the binary segmentation process separates between the circle and the rest of the square. The two contours defining the termination of the clustering process may include: the inner and outer borders of the square and inner circle with the ring, or the external borders of the square and the internal border of the square with the ring, or the external borders of the square and the border of the internal circle with the ring.

Figure 6:
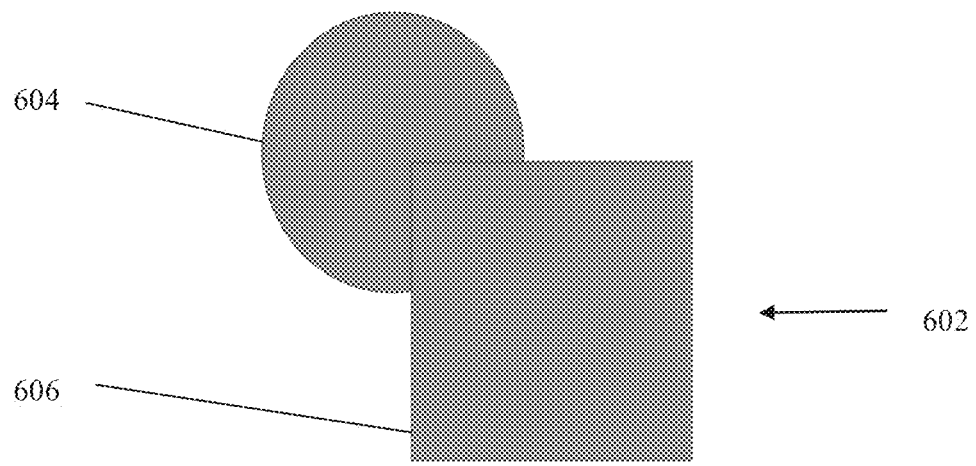
FIG. 6 is a schematic depicting the clustering process, in accordance with some embodiments of the present invention.
Figure 6:
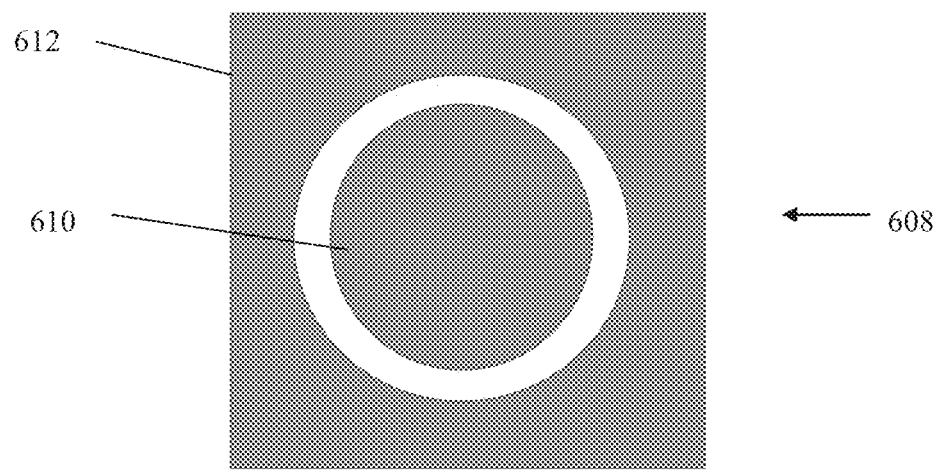

Reference is now made to FIG. 6, which is a schematic depicting the clustering process, in accordance with some embodiments of the present invention. Schematic 602 depicts clustering of an intersecting circle 604 and square 606. Schematic 608 depicts a trigger of the clustering process, and a circle 610 is found within a square 612.

Referring now back to FIG. 4, optionally at 410, each identified closed region (created by the clustering process) is evaluated to determine whether the respective closed region intersects the boundary of the image (indicating that a portion of the identified closed region is located outside of the image and is not fully visible within the image), or whether the respective closed region is spaced part from the boundaries of the image (indicating that the closed region is fully visible within the image).

At 412, the identified closed region is determined as being spaced apart from the boundaries of the first image.

A first correlation is computed between each identified closed region and a predefined geometrical shape of the landing pad. Optionally, the predefined geometrical shape of the landing pad is a square. A first correlation requirement of the first correlation denotes a tolerance of the similarity of the respective closed region to the square shape. The first correlation requirement may be defined according to a ratio of the lengths of the edges of the respective closed region, and/or an angle between two edges of the respective closed region.

A candidate landing pad is identified when the computed first correlation of the respective closed region is according to the first correlation requirement, for example, when the closed region is found to be similar to the square shape.

The first correlation may be computed for the respective identified closed region according to the following exemplary method: four points of the respective closed region are identified based on an assumption that the four points are indicative of four corners of the respective closed region. In terms of mathematical representation, the four points are denoted p0, p1, p2, and p3. Four vectors are computed according to the following equations: V00=p1−p0; V01=p2−p3; V10=p2−p1; and V11=p3−p0. The vectors are normalized according to the following equations: V00=V00/ ||V00||; V01=V01/||V01||; V10=V10/||V10||; and V11=V11/ ||V11||. ratio0 denotes the ratio of edge (p1,p0) and (p2,p3), computed as ratio0=||V00||/||V01||. ratio1 denotes the ratio of edge (p2,p1) and (p3,p0), computed as ratio1=||V10||/||V11||. ratio0 and ratio1 represent the computed value of the first correlation.

The first correlation requirement(s), denoted condition 1 and condition 2, are evaluated computed according to ratio0 and ratio1 (i.e., the computed value of the first correlation). The first correlation requirement is met when the following exemplary mathematical relationship are fulfilled:

condition1=ratio0<1.5AND ratio0>0.5AND ratio1<1.5AND ratio1>0.5, the above equation may be written in code as:

condition1=ratio0<1.5f&& ratio0>0.5f&& ratio1<1.5f&& ratio1>0.5f condition2=cosAngle0>minCosAngle AND cosAngle1>minCosAngle where:
cosAngle0=V00.v V01
cosAngle1=V10.v V11
.v denotes a dot product operation,
minCosAngle denotes a tolerance minimal angle on two adjacent edges.

The square is detected, and the candidate landing pad is identified when condition 1 and/or condition2 are fulfilled.

Figure 7:
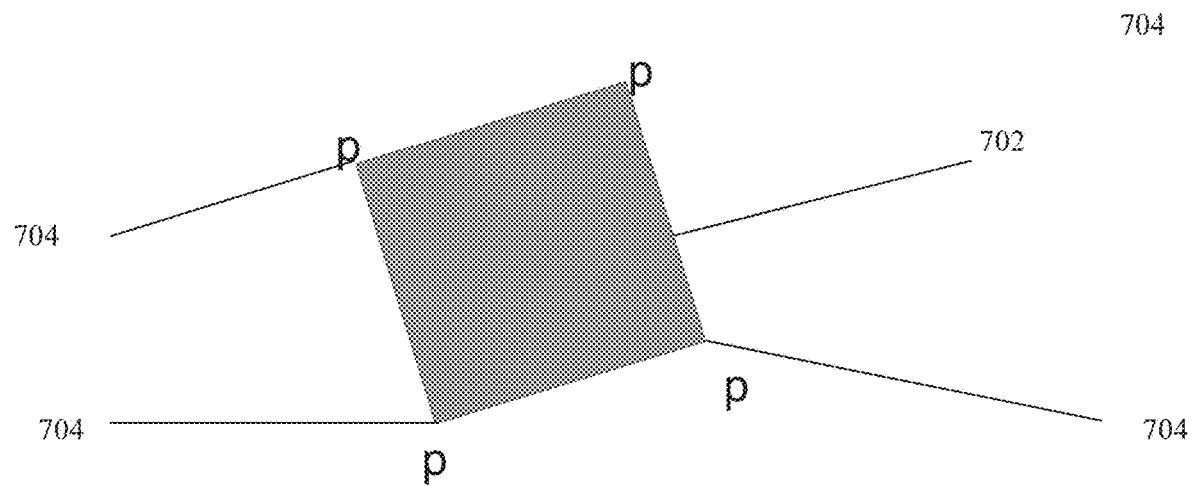
FIG. 7 is a schematic depicting an enclosed region located within the boundaries of the image, in accordance with some embodiments of the present invention.

Reference is now made to FIG. 7, which is a schematic depicting an enclosed region 702 located within the boundaries of the image, in accordance with some embodiments of the present invention. Four points 704 (*p*) are identified for detection of the square, as described herein.

Referring now back to act 412, when the candidate landing pad is identified, the landing pad is identified according to a second correlation is computed for the closed region located within the interior of the candidate landing pad. The second correlation is computed between the interiorly located closed region and the interior predefined geometrical shape of the landing pad, optionally a circle. The second correlation is computed according to a second correlation requirement defining the tolerance of similarity of the interior geometrical shape and the circle.

Optionally the landing pad is identified according to a third correlation requirement based on a predefined ratio between the area of the interior closed region of the candidate landing pad (e.g., circle) to the area of the corresponding larger closed region of the candidate landing pad according to a requirement (e.g., threshold, range) denoted requiredAreaRatio.

Alternatively, at 414, when the respective identified closed region intersects one or more borders of the image, an estimate of the non-visible portion of the respective closed region located outside of image is computed. An estimate of the complete shape of the closed region is computed based on the visible portion within the image.

Figure 8:
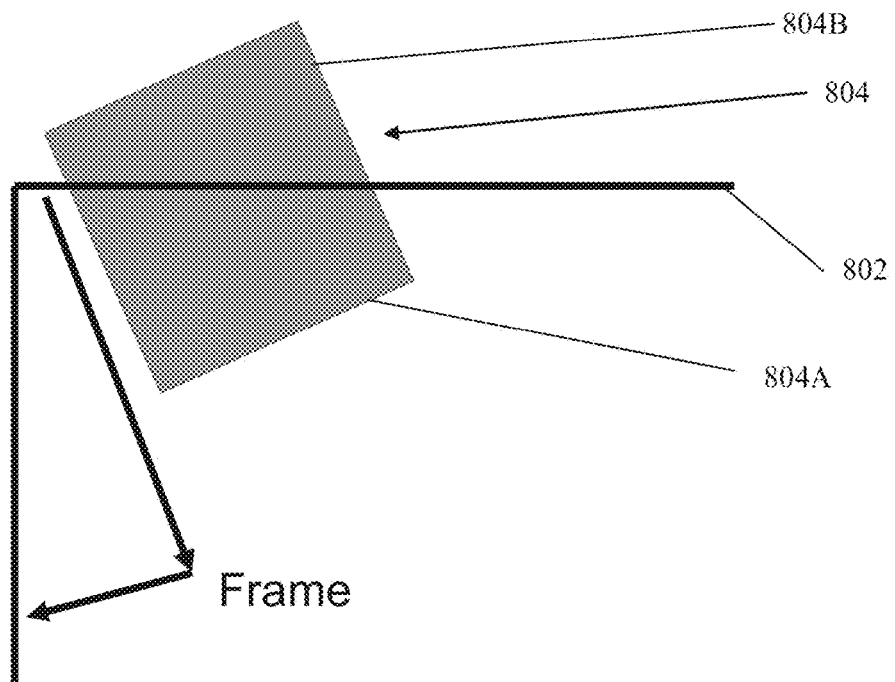
FIG. 8 is a schematic of a closed region intersecting a border of the image, in accordance with some embodiments of the present invention.

Reference is now made to FIG. 8, which is a schematic of a closed region 804 intersecting a border 802 of the image, in accordance with some embodiments of the present invention. Portion 804A of the closed region 802 is visible within the image. Portion 804B is located outside of the image, and is not visible within the image. An estimate of the complete shape of closed region 804 is computed based on visible portion 804A, as described herein.

Referring now back to act 414, the complete shape of the closed region may be computed according to a computed estimated location of the central region of the closed region. For example, the estimated location of the center of the square pad is computed according to at least one fully visible edge (it is noted that one fully visible edge of the square is sufficient for computing the location of the central region of the landing pad). Based on the computed estimated location of the center, the fully visible edge(s), the non-visible portions of the pad located outside of the borders of the image may be estimated to compute an estimated complete shape of the landing pad.

Optionally, the estimated complete shape is evaluated as described with reference to act 412, to identify the candidate landing pad. It is noted that the second correlation with the interior closed region is not necessarily performed, since the interior closed region may be located outside of the image, and therefore cannot be detected by the processing of the image. Alternatively, the estimated complete shape is already assumed to be a square.

At 416 the estimated the location of the central region of the landing pad is computed. Optionally, the edge(s) of the landing pad are computed, optionally according to the location of the central region. Alternatively, the edge(s) of the landing pad have been computed as described with reference to act 412 and/or 414. The computation is based on whether act 412 or act 414 is executed.

When act 412 is executed, the estimated location of the central region of the landing pad is computed according to the identified landing pad, optionally according to the location of the interior closed region, optionally the center of the circle.

Alternatively, when act 414 is executed, the estimate of the location of the central region of the landing pad is computed according to the estimate of the complete shape of the closed region, and/or the value computed for the estimated edge described with reference to act 414 is implemented. In terms of mathematical representation, when the complete shape of the closed region is denoted as points p0, p1, p2, and p3, the center may be computed as the intersection of the lines defined by the points: (p0,p2) and (p1,p3).

At 418, a segmentation mask indicative of the landing pad is computed according to the computed estimate of the location of the central region of the candidate landing pad and/or an estimate of the location of the edges of the candidate landing pad.

Figure 11:
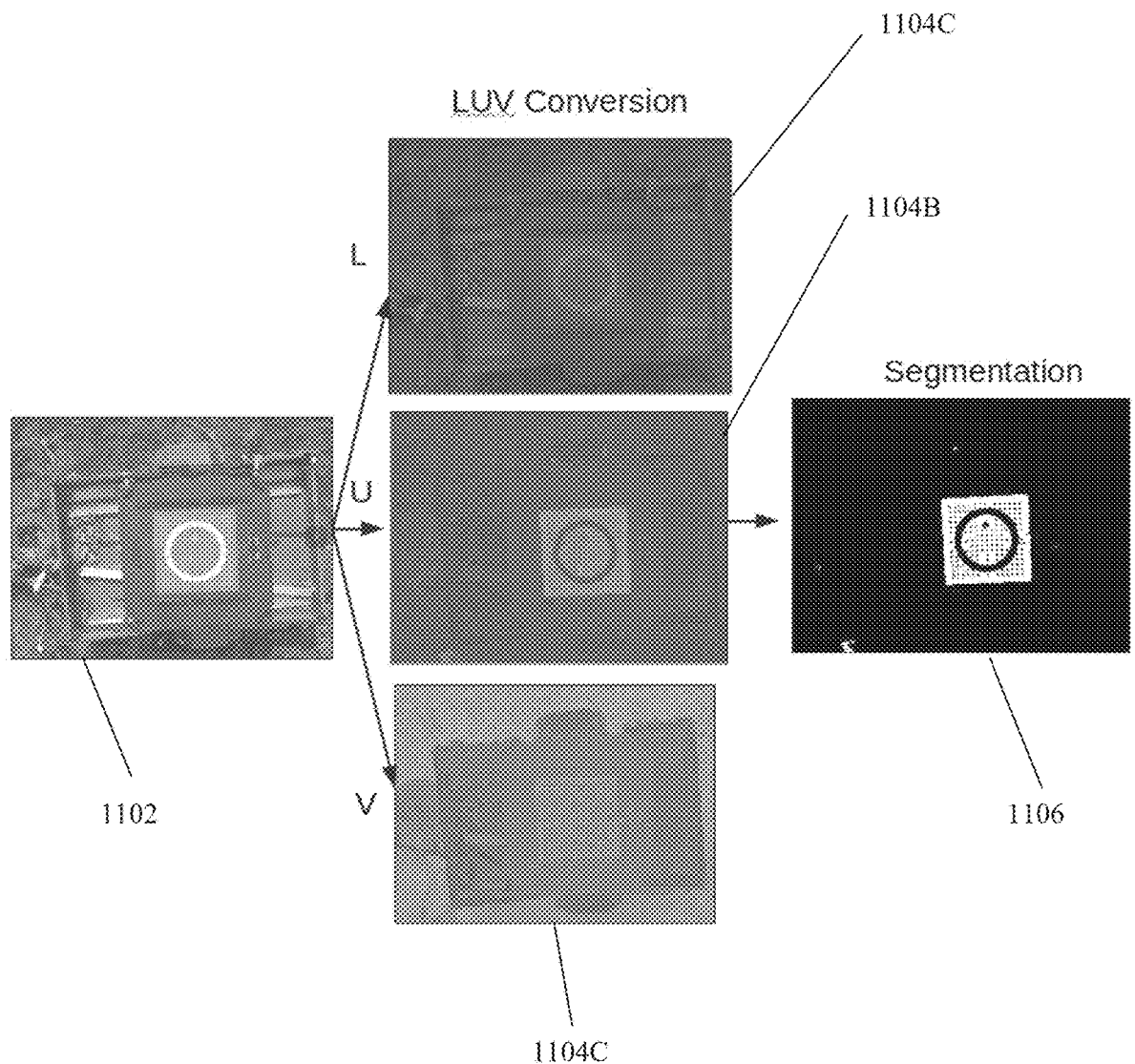
FIG. 11 includes images depicting the computation of the segmentation mask, in accordance with some embodiments of the present invention.

Reference is now made to FIG. 11, which includes images depicting the computation of the segmentation mask, in accordance with some embodiments of the present invention. Image 1102 is an example of a first image of the landing pad and surrounding environment captured by the drone, as described with reference to act 104 of FIG. 1. Images 1104A-C are created by conversion of image 1102 from the RGB color space to the LUV color space, as described with reference to act 104 of FIG. 1. Image 1104A denotes the L channel. Image 1104B denote the U channel. Image 1104C denotes the V channel. Image 1106 denotes the segmentation mask computed from the U channel (image 1104B), as described with reference to act 106 of FIG. 1, and/or FIG. 4.

Figure 12:
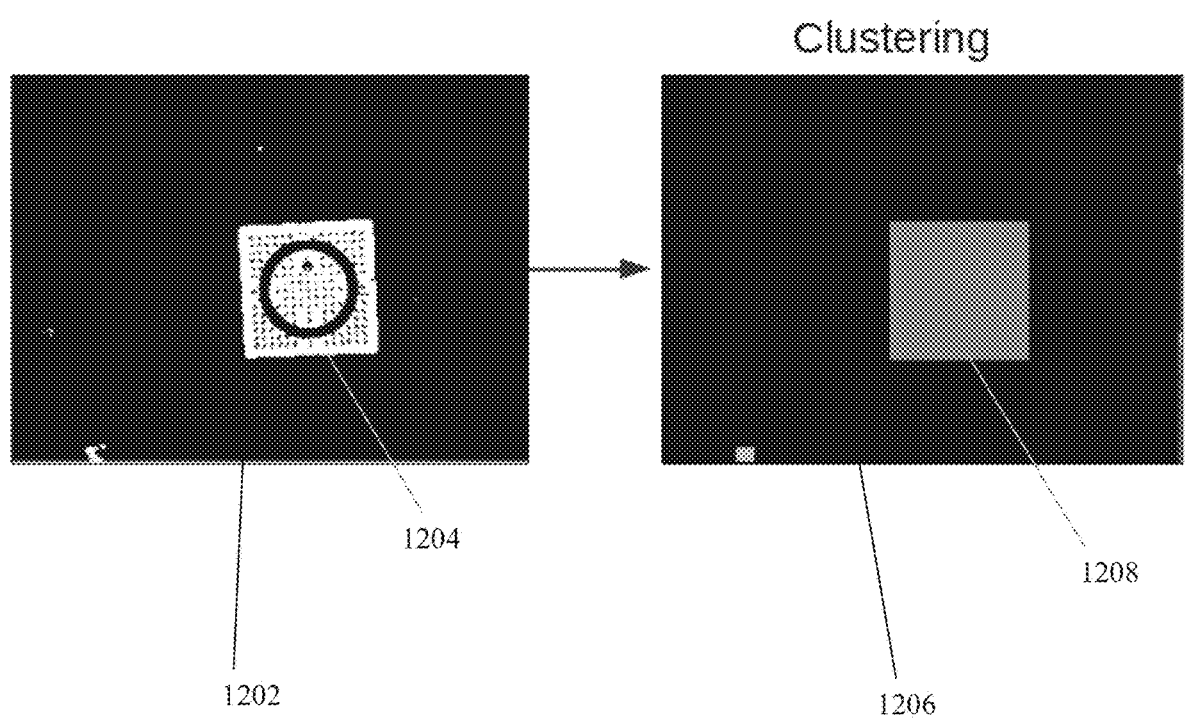
FIG. 12 is a set of images depicting the computation of the segmentation mask based on the outcome of the clustering process, in accordance with some embodiments of the present invention.

Reference is now made to FIG. 12, which is a set of images depicting the computation of the segmentation mask based on the outcome of the clustering process, in accordance with some embodiments of the present invention. Image 1202 includes a candidate landing pad 1204 created based on the clustering process described with reference to acts 408-412 of FIG. 4. Image 1206 includes a segmentation mask 1208 computed according to the candidate landing pad 1204, as described with reference to acts 416-418 of FIG. 4. It is noted that the clustering process is not necessarily executed.

Referring now back to FIG. 1, at 108, blocks 102-106 may be iterated until a stop condition is met. Each iteration may be performed on one image of a sequence of images acquired by the camera of the drone. The stop condition may be defined as, for example, when the segmentation mask of the landing pad is successfully computed, when the segmentation mask of the landing pad is identified as being entirely within the image, and/or when most of the segmentation mask is without the image (e.g., according to a requirement).

At 110, execution of a mid-range drone image processing landing code 214B for processing image(s) for navigating the drone closer to the landing pad according to the estimate of the location of the central region is triggered.

The execution of the mid-range drone image processing landing code may be triggered by one or more of: successful computation of the segmentation mask, altitude of the drone according to a requirement, for example, above a threshold of for example about 2 meters or 3 meters, below a threshold of for example about 4 or about 5 meters, or within a range of for example 2-5 meters or 2-4 meters, or other values. The requirement may be selected according to an indication of completion of the first (i.e., far-range) phase, and visibility of the guiding-elements of the landing pad within image(s) captured by the camera of the drone.

At 112, or more second sets of image(s) are captured by the camera. The capturing of the images and color conversion of the second set is implemented as described with reference to the first set of images of act 104.

At 114, the second image(s) are processed according to the segmentation mask, to compute a segmented region corresponding to the identified landing pad. One or more guiding-elements are extracted from the segmented region. An estimated location of the central region of the landing pad is computed according to an aggregation of vector data computed based on the extracted guiding-element(s).

Figure 5:
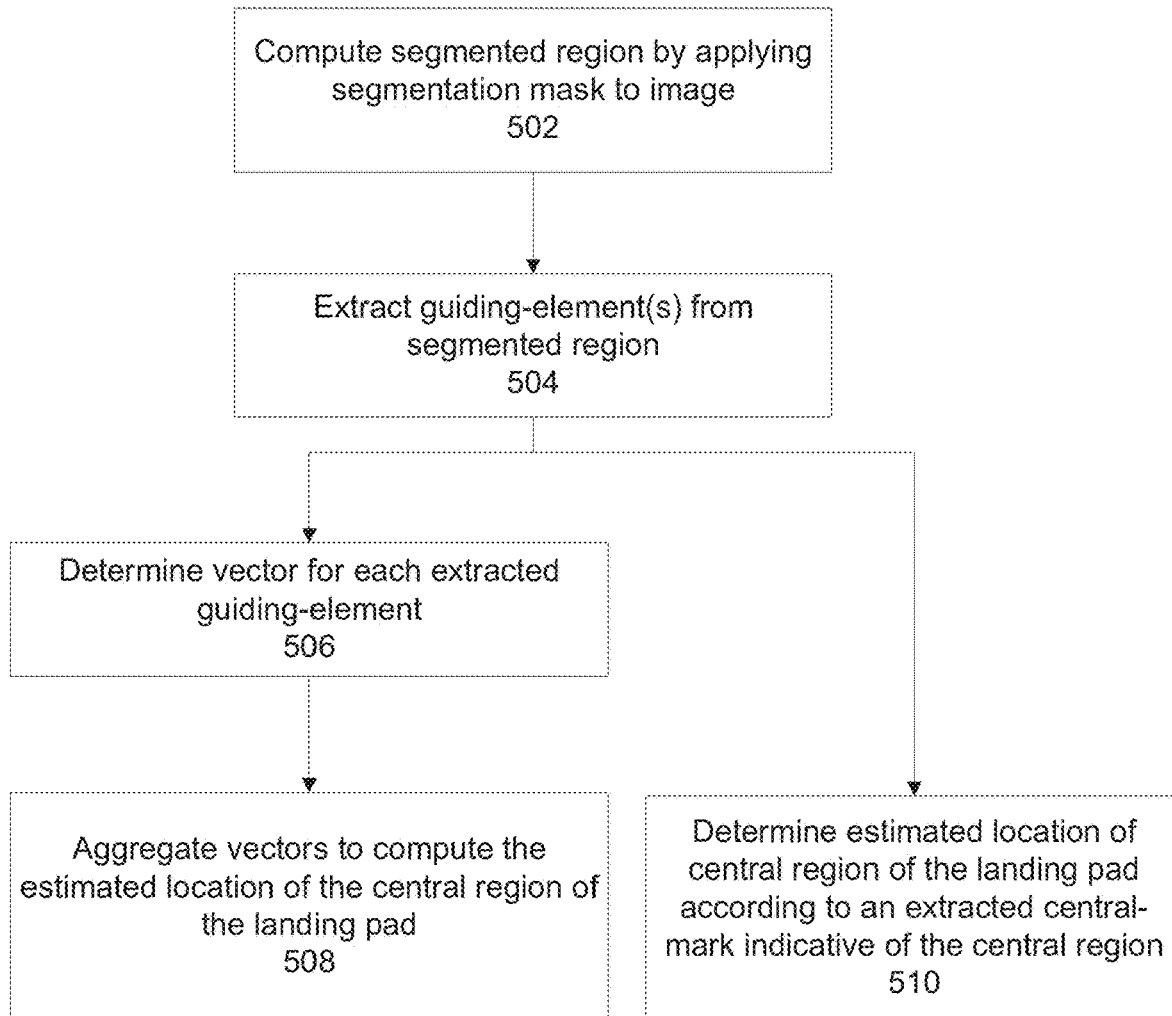
FIG. 5 is a flowchart of a method of processing one or more images captured by a camera for computation of an estimated location of the central region of the landing pad, computed based on an aggregation of vector data determined according to guiding-elements extracted from the segmented landing pad, by executing mid-range and/or close-range drone image processing landing code of the multi-stage landing process, in accordance with some embodiments of the present invention.

Reference is also made to FIG. 5, which is a flowchart of a method of processing one or more images captured by a camera for computation of an estimated location of the central region of the landing pad, computed based on an aggregation of vector data determined according to guiding-elements extracted from the segmented landing pad, by executing mid-range and/or close range drone image processing landing code of the multi-stage landing process, in accordance with some embodiments of the present invention.

At 502, the, the segmented region is computed by applying the segmentation mask to the second image(s).

The computation of the segmented region may be represented by the mathematical relationship: Uproc=U*mask, where Uproc denotes the processed image including the segmented region computed by element (e.g., pixel) wise multiplication of the second image denoted U with the segmentation mask denoted mask.

The segmentation mask may be represented as a binary image, with a pixel intensity value of 0 denoting background and a pixel intensity value of 1 denoting a region of interest (ROI) that includes the landing pad (or portion thereof).

Uproc is segmented into a binary image, for example, with code instructions executing the OTSU image processing method, for example, code instruction executing the OpenCV function.

At 504, one or more guiding-elements are extracted from the segmented region.

Optionally, the segmented region is filtered to exclude features below a size requirement prior to the extracting.

The guiding-elements may be extracted by applying a contour finding code to the segmented region. For example, the guiding-elements are extracted using fine edge detection over the segmented region, for example using the detection of zero crossing on a result of a Laplacian operator computed over the U plane. The identified contours are extracted and stored in a memory, for example, as a list, as cropping of the segmented region, as mathematical functions, and/or other representations.

Each contour (potentially denoting a guiding-element) is evaluated according to a contour requirement. The contour requirement may denote a computed smoothness of the contour of the guiding-element. Contours having a computed smoothness score above a threshold may be extracted as candidate guiding-elements.

Each candidate guiding-element is correlated with a predefined guiding-element template according to a guiding-element correlation requirement. There may be a single guiding-element template stored in memory. In such a case, the candidate guiding-element may be translated, resized, and/or rotated to attempt a fit with the template. Alternatively, there may be multiple templates of guiding-elements, optionally each template corresponds to one or more of the actual guiding-templates of the landing pad. The guiding-element correlation requirement is indicative of the confidence that the candidate guiding-element is identified as a guiding-element.

At 506, a vector is determined for each respective extracted guiding-element. The determined vector includes a direction oriented towards a candidate center of the landing pad according to a vector requirement, and optionally a magnitude indicative of the distance from the respective extracted guiding-element to the candidate center of the landing pad.

The vector is determined according to the image of the respective extracted guiding-element. The vector may be extracted from a template corresponding to the respective extracted guiding-element, and/or may be computed from the image of the respective extracted guiding-element. The direction of the vector may be computed according to the orientation of the guiding-element. The magnitude of the vector may be computed according to the length and/or size of the guiding-element.

Optionally, the direction of the vector is computed according to a central and/or longitudinal axis of each respective guiding-element located along a certain radial axis radiating out from the central region of the landing pad. The magnitude of the vector is indicative of the radial distance of the guiding-element away from the central region. The location and/or orientation of the distinct feature of each guiding-element points the vector towards the central region.

For example, when the guiding-element is T-shaped, the direction of the vector points along the stem of the T-shaped guiding-element towards the cross-bar of the T-shaped guiding-element. The magnitude of the vector is computed according to the length of the stem of the T-shaped guiding-element. The scale of the vector may be computed according to the width of the crossbar of the T-shaped guiding-element, to be invariant of the altitude of the drone above the landing pad.

Guiding-elements may be implemented as other shapes, which may be symmetrical along their respective long axis lined up along a respective radial axis, include a distinct feature defining the direction of the guiding-element for computation of the direction of the vector, and have a size (e.g., length) corresponding to the distance from the respective guiding-element to the central region for computation of the magnitude of the vector, for example, Y-shaped, V-shaped, !-shaped, ♀-shaped, ♂-shaped, and arrow-shaped.

As used herein, the terms size and length are sometimes interchangeable when referring to the property of the guiding-element indicative of the distance from the respective guiding-element to the central region of the landing pad for computation of the magnitude of the vector.

The size (e.g., length, area) of the guiding-element may represent an absolute and/or a relative distance to the central region of the landing pad. For example, the length of the guiding-element (measured along the radial axis) and/or the size of the area of the guiding-element may be correlated to the absolute distance from the guiding-element to the central region. For example, related by a factor of 10, so that for a guiding-element of length of 5 centimeters the distance to the central region is 50 centimeters. In another example, the length of each guiding-element and/or the size of the area of the guiding-element is computed as a relative value denoting the relative distance to the central region. For example, the length of a first guiding-element is 5 centimeters and the length of a second guiding-element is 10 centimeters, indicating that the second guiding-element is twice as far as the first-guiding element from the central region.

Optionally, guiding-elements are retained according to a requirement of the vector. The vector requirement may denote an estimation of the center-region of the landing pad computed according to the respective vector. Guiding-elements with associated vectors having a confidence of the estimated location of the center-region higher than a predefined threshold may be retained for aggregation.

Alternatively, when multiple guiding-element templates are implemented, each guiding-element template is associated with a predefined vector. In such a case, the vector is obtained from memory, for example, from a metadata tag storing parameters defining the vector, stored in associated with the respective guiding-element template.

Figure 9:
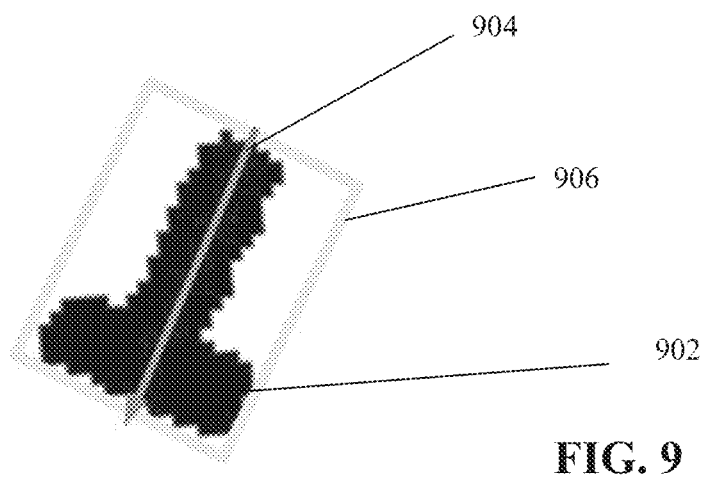
FIG. 9 is an image of an extracted T-shaped guiding-element and associated determined vector, in accordance with some embodiments of the present invention.

Reference is now made to FIG. 9, which is an image of an extracted T-shaped guiding-element 902 and associated determined vector 904, in accordance with some embodiments of the present invention. T-shaped guiding-element 902 may be extracted according to a bounding box 906.

Bounding box 906 may be matched to a guiding-element template, as described herein.

Referring back to act 508, the vectors are aggregated to compute the estimated location of the central region of the landing pad. The vectors may be summed to compute the estimated location of the central region. For example, the aggregation of the vectors denotes an aggregated vector having a magnitude and direction relative to a central region (e.g., denoted (0,0)) of the landing pad. For example, when the central region of the landing pad is centralized (or at another target location) in the image (i.e., at coordinates (0,0)), the sum of the vectors is zero, indicating that the landing region is at the center of the image and/or at the target location. When the aggregated vector indicates a certain magnitude and direction (i.e., non-zero), the drone may be navigated according to the aggregated vector to move the landing pad within the image such that the central region is at the target location.

Figure 10:
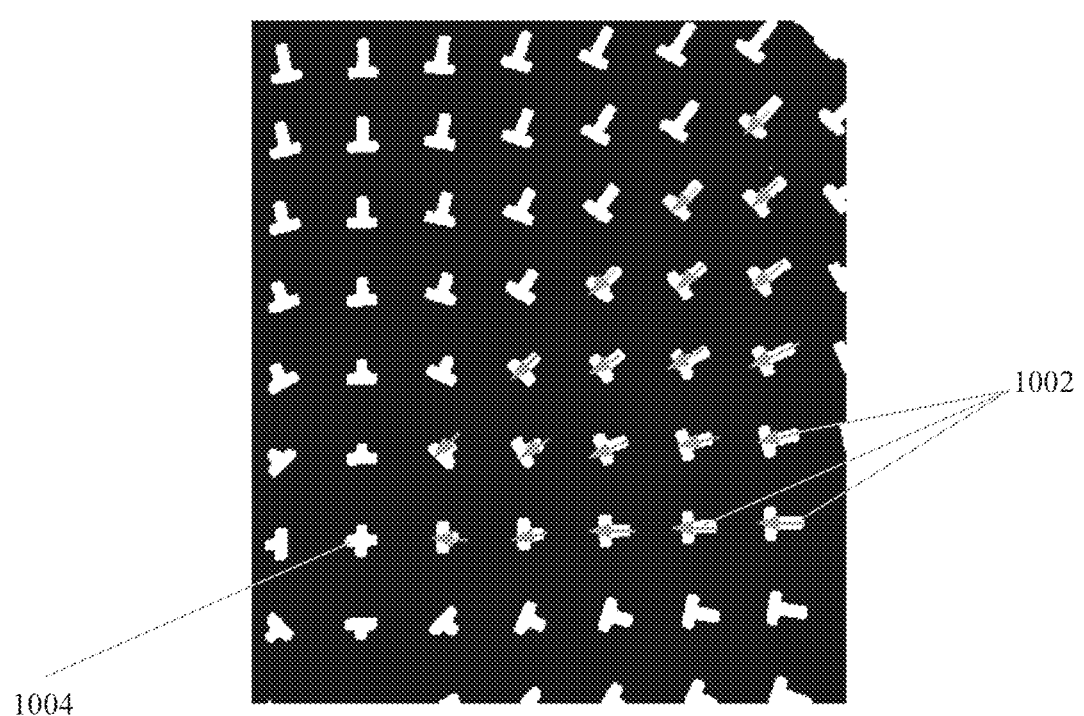
FIG. 10 is a schematic depicting aggregation of vectors of guiding-elements for estimation of the location of the central region of the landing pad, in accordance with some embodiments of the present invention.

Reference is now made to FIG. 10, which is a schematic depicting aggregation of vectors 1002 (only a few depicted for clarity) of guiding-elements for estimation of the location of the central region 1004 of the landing pad, in accordance with some embodiments of the present invention.

Referring back to FIG. 5, alternatively, act 510 is executed instead of one or more of acts 504, 506 and 508. Optionally, the second image is processed to identify a central-mark indicative of a central region of the landing pad, for example, the bull's eye shape. The central-mark may be identified, for example, by the contour finding code that computes the contour of the central-mark based on edge detection, by correlating a contour with the central-mark, and/or by correlating an extracted portion of the second image with a template of the central-mark. In such a case, the estimated location of the central region is defined according to the identified central-mark. The central-mark may be identified by act 504, by the contour finding code that extracts the central-mark, or by other image processing methods. A field storing a confidence associated with the identified location of the central-region may be set to a relatively high value, for example, 1 or the maximum possible value.

Referring now back to FIG. 1, at 116, blocks 110-114 may be iterated until a stop condition is met. Each iteration may be performed on one second type of image of a sequence of images acquired by the camera of the drone. The stop condition may be defined as, for example, when the computed central location of the landing pad is according to a requirement, for example a threshold denoting a confidence level of accuracy of the central region, and/or when a certain number of vectors are included in the aggregation.

At 118, execution of a close-range drone image processing landing code 214C for processing image(s) for navigating and landing, optionally vertically landing, the drone on the landing pad according to the estimated location of the central region of the landing pad and/or according to an extracted central-mark denoting the central region of the landing pad is triggered. The executing of the close-range drone image processing landing code 214C may be triggered upon successful identification of the location central region of the landing pad. It is noted that when the central-marking is successfully extracted from the second image(s), according to arrow 134, act 122 may be executed without necessarily executing acts 118 and 120. For example, a parameter indicative of the coordinates of the central region of the landing pad is stored in the memory of the computing device. The value of the coordinates stored in the parameter may be initially set to negative values for example (−1, −1) indicating that the coordinates of the central location of the landing pad is not found. When the value of the coordinates of the central location stored in the parameter are set to a positive value, the value is indicative of the estimated location of the central region of the landing pad. When the central location of the landing pad is not yet found, or is lost and needs to be re-found, the values of the parameter are re-set to the negative values.

Optionally, at 120, a third set(s) of image(s) are captured. The capturing of the images and color conversion of the second set is implemented as described with reference to the first set of images of act 104.

Optionally, at 122, the third image(s) are processed to extract the central-mark (e.g., bull's eye). The central-mark may be extracted by applying the segmentation mask to the third image(s), to compute a segmented region corresponding to the identified landing pad. Alternatively or additionally, the extraction of the central-mark is guided according to the estimated location of the central region within the image of the landing pad. The central-mark is extracted from the segmented region, for example, by contour finding code designed to extract the contour of the central-mark such as by edge detection, by identifying a contour correlated with the central-mark, and/or correlating a portion of the third image(s) with a template of the central marking, and/or other methods, for example, as described with reference to act 114 of FIG. 1 and/or FIG. 5.

The drone may be automatically navigated and/or landed according to the extracted central-mark within the third image(s) and/or according to the estimated location of the central-mark within the third image(s).

At 124, blocks 118-122 may be iterated until a stop condition is met. Each iteration may be performed on one third type of image of a sequence of images acquired by the camera of the drone. The stop condition may be defined as, for example, when the drone completes the landing on the landing pad.

At 126, a return is triggered to an earlier stage. A return may be made from: mid-range stage 130 during execution of mid-range image processing landing code 214B to far-range-stage 128 for execution of far-range image processing landing code 214A, from close-range stage 132 during execution of close-range image processing landing code 214C to mid-range stage 130 for execution of mid-range image processing landing code 214B, from close-range stage 132 during execution of close-range image processing landing code 214C to far-range-stage 128 for execution of far-range image processing landing code 214A, and/or the automated landing process may be aborted (e.g., triggering hovering or continued flight) from the far-range 128, mid-range 130, or close-range 132 stages.

The return to an earlier stage may be triggered, for example, by one or more of: a user manually pressing a button on a control interface to abort the automate landing and try again, code instructions that trigger return to an earlier stage when processing of the image encounters an error, for example, the landing pad is moved, the landing pad disappears from the image (e.g., the landing pad is removed, the landing pad is covered, the drone is moved away from above the landing pad by a gust of wind, the drone loses the landing pad in the image due to excess navigation above the landing site), code instructions that trigger return to an earlier stage when landing conditions are unsuitable (e.g., strong wind), and/or code instructions that detect other errors (e.g., internal computation error in processing images, camera error, navigation error).

Optionally, at 134, act 122 is executed after act 114 for landing the drone, without execution of acts 118 and 120. Act 122 may be executed after act 114 when the central-mark is extracted from the second set(s) of image(s) of the landing pad. Optionally, following 126, or 124, mid-range stage 130 or close range-stage 132 are respectively executed, optionally alternating the execution of the mid-range stage 130 or the close range-stage 132 according to whether the central-mark is extracted from the image or not.

The method described with reference to FIG. 1 may be run, for example, according to the frame capture rate of the video from which the images are extracted, for example, at a rate of 15-28 frames per second (fps) on a NVIDIA TK1 platform.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant drones will be developed and the scope of the term drone is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A landing pad for automated vertical landing of a drone thereof, the landing pad comprising:
    a pad having surface dimensions sized for contacting the drone;
    a plurality of guiding-elements arranged along a plurality of radial axes radiating from a central region, at a plurality of radial distances away from the central region, each of the plurality of guiding-element includes a distinct feature oriented towards the central region and a size of each of the plurality of guiding-element is indicative of the radial distance of the respective guiding-element away from the central region;
    wherein each of the plurality of guiding-elements is oriented along a certain radial axis radiating out from the central region;
wherein a length of the guiding-element along the certain radial axis is indicative of a distance from the respective guiding element to the central region;
wherein each the plurality of guiding-elements is a member of a group consisting of: a Y-shaped guiding-element, V-shaped guiding-element, !-shaped guiding-element, ♂-shaped guiding-element, ♀-shaped guiding-element, and arrow-shaped guiding-element.

2. The landing pad of claim 1, wherein each the plurality of guiding-elements having a distinct feature located relatively closer to the central region than a base of the guiding-element.

3. The landing pad of claim 1, wherein each the plurality of guiding-elements comprises a stem indicative of a distance from the respective guiding element to the central region.

4. The landing pad of claim 1, wherein the surface of the landing pad has a predefined color selected for differentiating the landing pad from colors of the environment in proximity to the landing pad.

5. The landing pad of claim 1, wherein the color of the surface of the landing pad is red.

6. The landing pad of claim 1, wherein the landing pad is square shaped.

7. The landing pad of claim 6, further comprising a circle marked within the square shaped landing pad.

8. The landing pad of claim 1, further including a mark denoting the location of the central region.

9. A drone executing a computer implemented method for automatically landing on a landing pad having thereon a plurality of guiding-elements arranged in a pattern relative to a central region of the landing pad, comprising:
at least one camera adapted to capture at least one image;
a processor adapted to execute a code for:
processing the at least one image to identify at least one of the plurality of guiding-elements,
determining at least one vector for the at least one guiding-element, and
computing an estimated location of the central region of the landing pad according to the at least one vector; and
navigating and landing the drone on the landing pad according to the estimated location of the central region of the landing pad.

10. The drone of claim 9, wherein each of the plurality of guiding-elements is oriented along a certain radial axis radiating out from the central region.

11. The drone of claim 9, wherein a length of the guiding-element along the certain radial axis is indicative of a distance from the respective guiding element to the central region.

12. The drone of claim 9, wherein a magnitude of the vector determined for the at least one guiding-element is computed according to a size of the at least one guiding-element and a direction of the vector is determined for the at least one guiding-element according to an orientation of a distinct feature thereof.

13. The drone of claim 9, wherein each of the plurality of guiding-elements is:
oriented along the certain radial axis,
has a length indicative of the distance to the central region, and
includes a distinct feature indicative of a direction in relation to the central region.

14. The drone of claim 9, wherein the processor is adapted to execute the code for processing the at least one image to identify a central-mark defining a central region of the landing pad, and defining the estimated location of the central region according to the identified central-mark.

15. The drone of claim 9, wherein the at least one guiding-element is identified using a segmentation mask that excludes features below a size requirement.

16. The drone of claim 9, wherein the processor is adapted to execute the code for performing the processing by:
identifying at least one candidate guiding-element;
correlating each candidate guiding-element with a predefined guiding-element template according to a guiding-element correlation requirement.

17. The drone of claim 9, herein the processor is adapted to execute the code for converting a first color space of in the at least one image to a second color space according to the predefined color of the landing pad relative to expected colors of the environment in proximity to the landing pad, and processing the at least one image accordingly.

18. The drone of claim 17, wherein the first color space is RGB (red, green, blue), the second color space is LUV, and the processing is performed according to a U channel of the at least one converted image.

19. The drone of claim 9, further comprising:
processing the at least one image to extract a central-mark defining the central region of the landing pad;
wherein the navigating and landing the drone is performed according to the extracted central-mark.

* * * * *